US012725043B2

(12) United States Patent
Thakker et al.

(10) Patent No.: US 12,725,043 B2
(45) Date of Patent: Sep. 1, 2026

(54) SYSTEM, DEVICES AND/OR PROCESSES FOR ADAPTING NEURAL NETWORK PROCESSING DEVICES

(71) Applicant: Arm Limited, Cambridge (GB)

(72) Inventors: Urmish Ajit Thakker, Austin, TX (US); Jesse Garrett Beu, Austin, TX (US); Dibakar Gope, Austin, TX (US); Mark John O'Connor, Luebeck (DE)

(73) Assignee: Arm Limited, Cambridge (GB)

( * ) Notice: Subject to any disclaimer, the term of this patent is extended or adjusted under 35 U.S.C. 154(b) by 1077 days.

(21) Appl. No.: 17/349,780

(22) Filed: Jun. 16, 2021

(65) Prior Publication Data

US 2022/0405597 A1 Dec. 22, 2022

(51) Int. Cl.

| | |
|---|---|
| ***G06N 3/082*** | (2023.01) |
| ***G06F 18/21*** | (2023.01) |
| ***G06F 18/24*** | (2023.01) |
| ***G06N 3/04*** | (2023.01) |
| ***G06V 10/44*** | (2022.01) |
| ***G06V 10/94*** | (2022.01) |
| ***G10L 15/02*** | (2006.01) |
| ***G10L 15/16*** | (2006.01) |

(52) U.S. Cl.

CPC ............. *G06N 3/082* (2013.01); *G06F 18/21* (2023.01); *G06F 18/24* (2023.01); *G06N 3/04* (2013.01); *G06V 10/449* (2022.01); *G06V 10/94* (2022.01); *G10L 15/02* (2013.01); *G10L 15/16* (2013.01)

(58) Field of Classification Search

CPC ........ G06N 3/082; G06N 3/04; G06N 3/0464; G06N 3/0475; G06N 3/0495; G06N 3/0499; G06V 10/449; G06V 10/94; G06F 18/24; G06F 18/21; G10L 15/02; G10L 15/16

See application file for complete search history.

(56) References Cited

U.S. PATENT DOCUMENTS

| | | | | |
|---|---|---|---|---|
| 2019/0268215 | A1* | 8/2019 | Tellado | H04L 41/0672 |
| 2019/0294929 | A1* | 9/2019 | Yao | G06F 18/217 |
| 2020/0110995 | A1* | 4/2020 | Croxford | G06N 3/045 |
| 2020/0134809 | A1* | 4/2020 | Moioli | G06T 7/0004 |
| 2020/0210832 | A1* | 7/2020 | Driscoll | G06N 3/063 |
| 2020/0401891 | A1* | 12/2020 | Xu | G06N 3/04 |
| 2021/0183052 | A1* | 6/2021 | Ikeda | G06N 3/04 |
| 2021/0334663 | A1* | 10/2021 | Shen | G06N 3/0464 |

(Continued)

OTHER PUBLICATIONS

Yang et al., "NetAdapt: Platform-Aware Neural Network Adaptation for Mobile Applications," ECCV 2018 (Year: 2018).*

(Continued)

*Primary Examiner* — Miranda M Huang
*Assistant Examiner* — Yao David Huang
(74) *Attorney, Agent, or Firm* — Berkeley Law & Technology Group, LLP

(57) ABSTRACT

Example methods, apparatuses, and/or articles of manufacture are disclosed that may be implemented, in whole or in part, using one or more computing devices to adapt a computing device to classify physical features in a deployment environment. In a particular implementation, computing resources may be selectively de-allocated from at least one of one or more elements of a computing architecture based, at least in part, on assessed impacts to the one or more elements of the computing architecture.

16 Claims, 5 Drawing Sheets

(56) References Cited

U.S. PATENT DOCUMENTS

| | | | | |
|---|---|---|---|---|
| 2022/0036193 | A1* | 2/2022 | Prediger | G06N 3/082 |
| 2022/0261631 | A1* | 8/2022 | Cohen | G06N 3/0895 |
| 2022/0309271 | A1* | 9/2022 | Pai | G06N 3/096 |
| 2022/0383121 | A1* | 12/2022 | Suri | G06N 3/063 |
| 2023/0004811 | A1* | 1/2023 | Ishikawa | G06N 3/096 |
| 2023/0186093 | A1* | 6/2023 | Duong | G06N 3/063 706/25 |
| 2023/0229895 | A1* | 7/2023 | Nunes Coelho, Jr. | G06N 3/0495 706/27 |

OTHER PUBLICATIONS

Kang et al., "Operation-Aware Soft Channel Pruning using Differentiable Masks," Proceedings of the 37th International Conference on Machine Learning, Online, PMLR 119, 2020 (Year: 2020).*

Lin et al., "Runtime Neural Pruning," 31st Conference on Neural Information Processing Systems (NIPS 2017), Long Beach, CA, USA (Year: 2017).*

Howard, et al, "MobileNets: Efficient Convolutional Neural Networks for Mobile Vision Applications," arXiv: 1704.04861v1 [cs. CV], Apr. 17, 2017, 9 Pages.

Noroozi, et al, "Unsupervised Learning of Visual Representations by Solving Jigsaw Puzzles," arXiv: 1603.09246v2 [cs.CV], Jun. 26, 2016, 18 Pages.

Plemakova, "Vehicle Detection Based on Convolutional Neural Networks," https://duckduckgo.com/?q=PLEMAKOVA%2C+%22Vehicle+Detection+Based+on+Convolutional+Neural+Networks%2C%22+&atb=v262-1&ia=web, May 21, 2018, 43 Pages.

Yerra, "Car Image Classification Using Features Extracted from Pre-trained Neural Networks," https://towardsdatascience.com/classifying-car-images-using-features-extracted-from-pre-trained-neural-networks-39692e445a14, Dec. 19, 2019, retrieved online Sep. 18, 2021, 10 Pages.

* cited by examiner

SYSTEM, DEVICES AND/OR PROCESSES FOR ADAPTING NEURAL NETWORK PROCESSING DEVICES

BACKGROUND

1. Field

The present disclosure relates generally to neural network processing devices.

2. Information

Neural Networks have become a fundamental building block in machine-learning and/or artificial intelligence systems. A neural network may be constructed according to multiple different design parameters such as, for example, network depth, layer width, weight bitwidth, approaches to pruning, just to provide a few example design parameters that may affect the behavior of a particular neural network processing architecture. Particular design choices for such design parameters may be selected based, at least in part, on particular performance and/or cost objectives.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
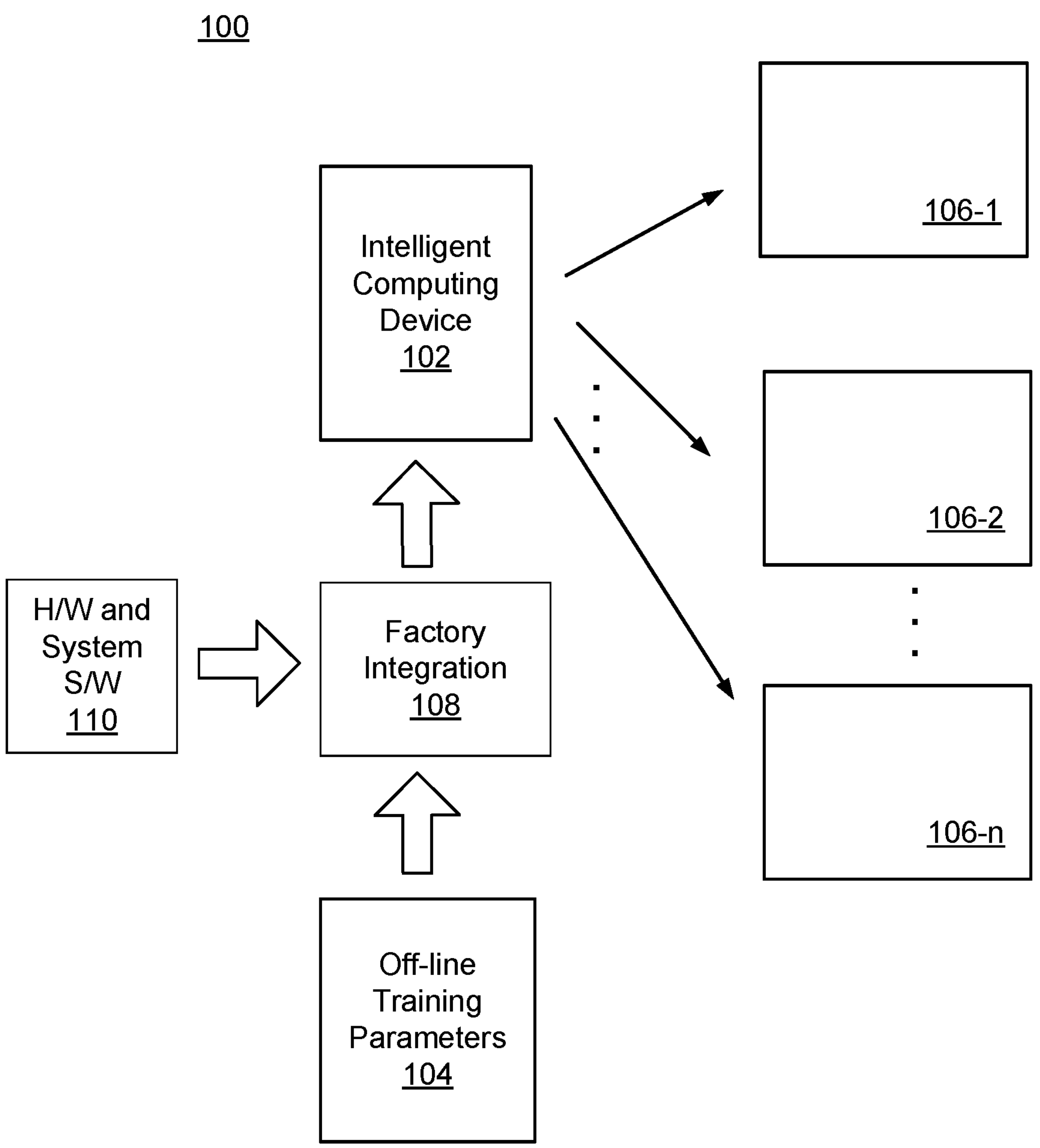
FIG. 1 is a graph illustrating a portion of a process for deployment of computing devices in operational environments, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among the artificial neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented one or more computing devices such as computing devices shown in FIG. 4. In a particular implementation, weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a weight to input signals, and sum weighted input signals to generate a linear combination.

Edges in a neural network connecting nodes may model synapses capable of transmitting signals (e.g., represented by real number values) between neurons. Receiving such a signal at a node in a neural network, the node may perform some computation to generate an output signal (e.g., to be provided to another node in the neural network connected by an edge) based, at least in part, on one or more weights and/or numerical coefficients associated with the node and/or edges providing the output signal. In a particular implementation, such weights and/or numerical coefficients may be adjusted and/or updated as the as learning progresses. For example, such a weight may increase or decrease a strength of an output signal. In an implementation, transmission of an output signal from a node in a neural network may be inhibited if a strength of the output signal does not exceed a threshold value.

According to an embodiment, a neural network may be structured in layers such that a node in a particular neural network layer may receive output signals from one or more nodes in a previous layer in the neural network, and provide an output signal to one or more nodes in a subsequent layer in the neural network. One specific class of layered neural networks may comprise a convolutional neural network (CNN) or space invariant artificial neural networks (SIANN) that enable deep learning. Such CNNs and/or SIANNs may be based on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In terms of computing resources, neural networks may occupy large amounts of memory for model storage and consume millions of operations per second in real-time execution. Given a particular neural network architecture, a model may be compressed to yield significant memory and compute savings. Such techniques to yield memory and compute savings may include, for example, pruning, weight quantization, and activation quantization.

In particular implementations, intelligent computing devices to perform functions supported by neural networks may comprise a wide variety of stationary and/or mobile devices, such as, for example, automobile sensors, biochip transponders, heart monitoring implants, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, and/or the like. Such devices to perform functions supported and/or enabled by neural networks may be configured in a factory based, at least in part, on weights to be associated with nodes and/or edges in such neural networks. Devices implementing factory configured neural networks may then be deployed in an operational environment.

According to an embodiment, functions of factory-configured computing devices may perform classification operations based, for example, on observations of an operational environment. In a particular implementation, such a factory-configured computing device may comprise sensors to generate signals responsive to physical phenomenon that may be processed to infer an observed presence of features. For example, such a factory-configured computing device may perform classification of images or audio signals (e.g., speech recognition), or visual object detection based, at least in part, on signals generated by imaging devices (e.g., pixel values), microphones, environmental sensors (e.g., light detectors, thermometers, radio frequency (RF) receivers, atmospheric pressure sensors), location/position sensors (e.g., accelerometers, gyroscopes, magnetometers), just to provide a few examples.

According to an embodiment, devices to perform functions supported by neural networks may be configured in a factory to perform classification operations for a robust set of classifications that are applicable to a large variety of operational environments. Such a robust set of classifications may be applicable to operational environments including, for example, a traffic intersection, zoo, office, school, factory floor, outdoor stadium, airport terminal, just to provide a few examples of different operational environments to which a robust set of classifications may be applicable. In particular implementations, a neural network supporting classification operations for such a robust set of classifications may be configured to have an associated robust quantization of weights and/or robust network of filters defining a robust network of inference paths. Implementation of such a robust quantization of robust quantization of weights and/or network of filters may entail an associated consumption of computing resources (e.g., memory, battery life, cooling, processor cycles) to execute such a neural network in real-time in an operational environment.

According to an embodiment, intelligent computing devices configured in a factory to have a robust quantization of weights and/or network of filters may be adapted to disable/remove particular inference paths and/or increase quantization if such a robust quantization and/or network of inference paths are not essential for classification operations in a particular operational environment of interest. For example, a technician may access hardware and/or software features of an intelligent computing device to, for example, disable/remove particular inference paths and/or increase quantization while maintaining sufficient inference paths and/or quantization to perform classification operations acceptably for a particular operational environment. Alternatively, software features of an intelligent computing device may be updated through interaction with a remote and/or cloud-based server device. In certain applications/installations, however, enabling such access to hardware and/or software resources of an intelligent computing (e.g., using a human technician and/or remote and/or cloud-based server may introduce unacceptable security risks.

Briefly, one particular embodiment is directed to a method comprising: executing elements of a computer architecture of a computing device to classify physical features in a deployment environment based, at least in part, on signals generated by one or more sensors; assessing one or more impacts of one or more of the elements of the computing architecture in classifying the physical features; and selectively de-allocating computing resources of the computing device from at least one of the one or more elements of the computing architecture based, at least in part, on the assessed impacts. By de-allocating computing resources from elements of a computing architecture having an insignificant impact on classification operations, computing resources may be conserved without sacrificing performance or exposing a deployed computing device to certain security risks.

FIG. 1 is a schematic diagram of a process 100 illustrating aspects of manufacture, integration and deployment of an intelligent computing device according to an embodiment. Intelligent computing device 102 may comprise automobile sensors, biochip transponders, heart monitoring implants, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, intelligent computing device 102 may be configured in a factory to perform any one of several functions including, for example, classification operations. For example, intelligent computing device 102 may comprise computing resources that are configurable to execute/implement one or more neural networks capable of performing a robust set of classifications that are applicable to a large variety of different deployment environments 106-1 through **106-*n*. Deployment environments 106-1 through 106-*n*** may include, for example, a traffic intersection, zoo, office, school, factory floor, outdoor stadium, airport terminal, as mentioned above.

According to an embodiment, intelligent computing device 102 may be produced in factory integration 108 of hardware and system software 110 and off-line training parameters 104. In a particular implementation, hardware and system software 110 may comprise processors, memory, busses, computer-readable instructions stored in memory for implementing an operating system, application program interfaces (APIs) and/or some application program. One such API and/or application program may implement machine-learning models that are enabled by specific computing structures such as, for example, neural networks.

Off-line training parameters 104 may adapt particular computing structures and/or application programs to perform particular tasks such as, for example, classification operations. In an embodiment, off-line training operations 104 may be determined, at least in part, by iterations of particular machine-learning programs based, at least in part, on input parameters provided in a set of training parameters. Such training parameters may be based, at least in part, on sensor observations, for example. In a particular implementation, such training parameters based on sensor observations may enable intelligent computing device 102 to perform classification operations in different deployment environments 106-1 through **106-*n***. For example, such training parameters may include weights that are to be applied by nodes and/or edges of a neural network. It should be understood, however, that this is merely an example of training parameters that may be developed off-line, and that claimed subject matter is not limited in this respect.

In this context, “classification operations” as referred herein means operations to classifying signals into any one of multiple different classifications and/or categories. In a particular implementation, such classification operations may be enabled, at least in part, by filters formed in a neural network. In a particular implementation, such filters may be tailored and/or implemented at least in part by off-line training parameters 104.

While a factory-configured intelligent computing device 102 may be suitable for deployment in any one of deployment environments 106-1 through **106-*n*, intelligent computing device 102 may be deployed (e.g., permanently deployed) in a single deployment environment 106-*i*. According to an embodiment, intelligent computing device 102 may be capable of performing adequately in single deployment environment 106-*i* using classification operations for only a subset of classifications that are relevant to single deployment environment 106-*i*. For example, an intelligent computing device 102 deployed in single deployment environment 106-*i* need not employ classification operations for a full set of detectable classification features enabled by a factory configuration. In a particular implementation, to reduce usage of computing resources, an intelligent computing device 102 may be adapted to reduce a set of classification features that are detectable by classification operations once intelligent computing device 102 is deployed in single deployment environment 106-*i***.

Figure 2A:
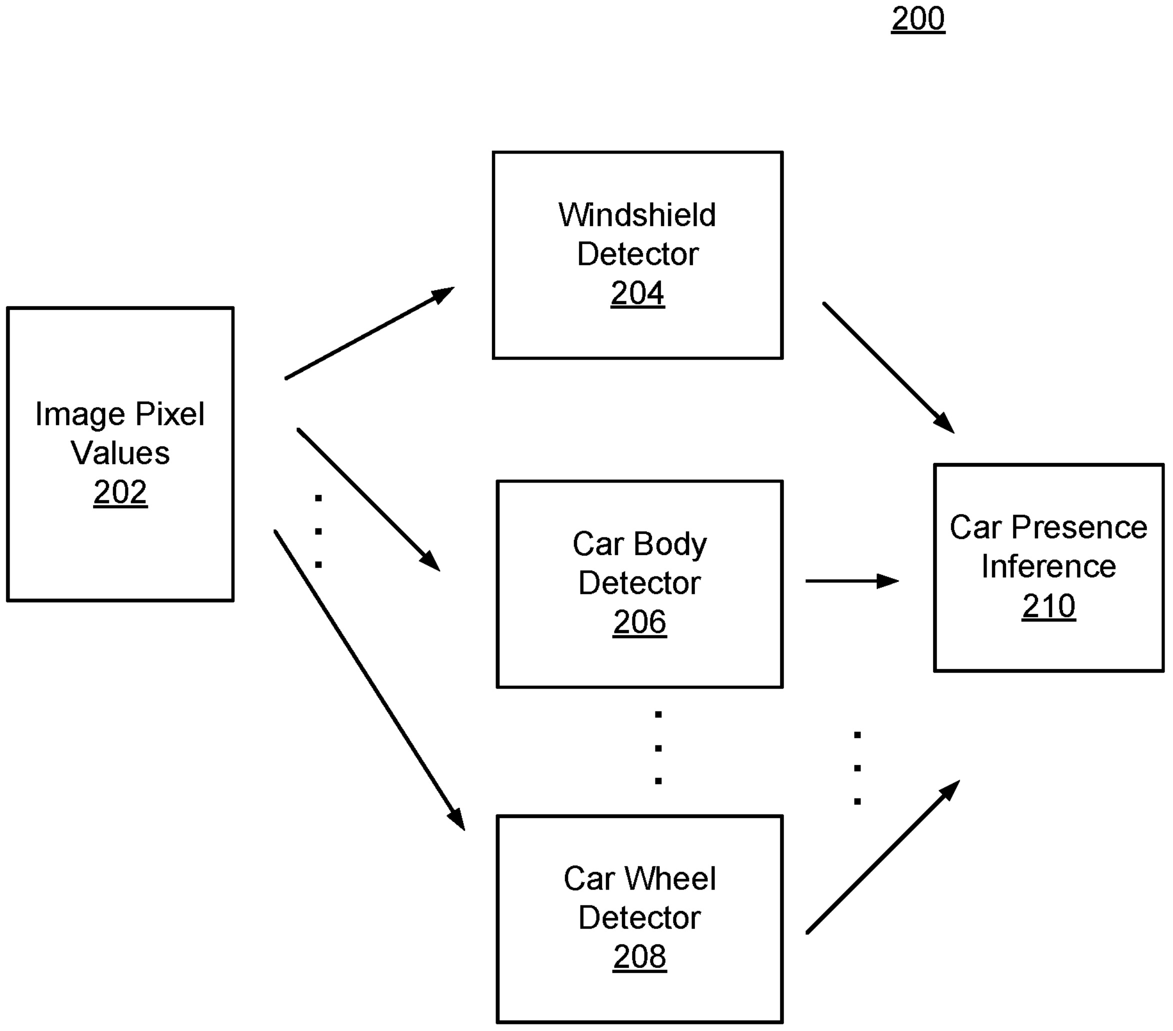
FIGS. 2A and 2B are graphs illustrating processes for detection and/or classification of visual objects, according to an embodiment.
Figure 2B:
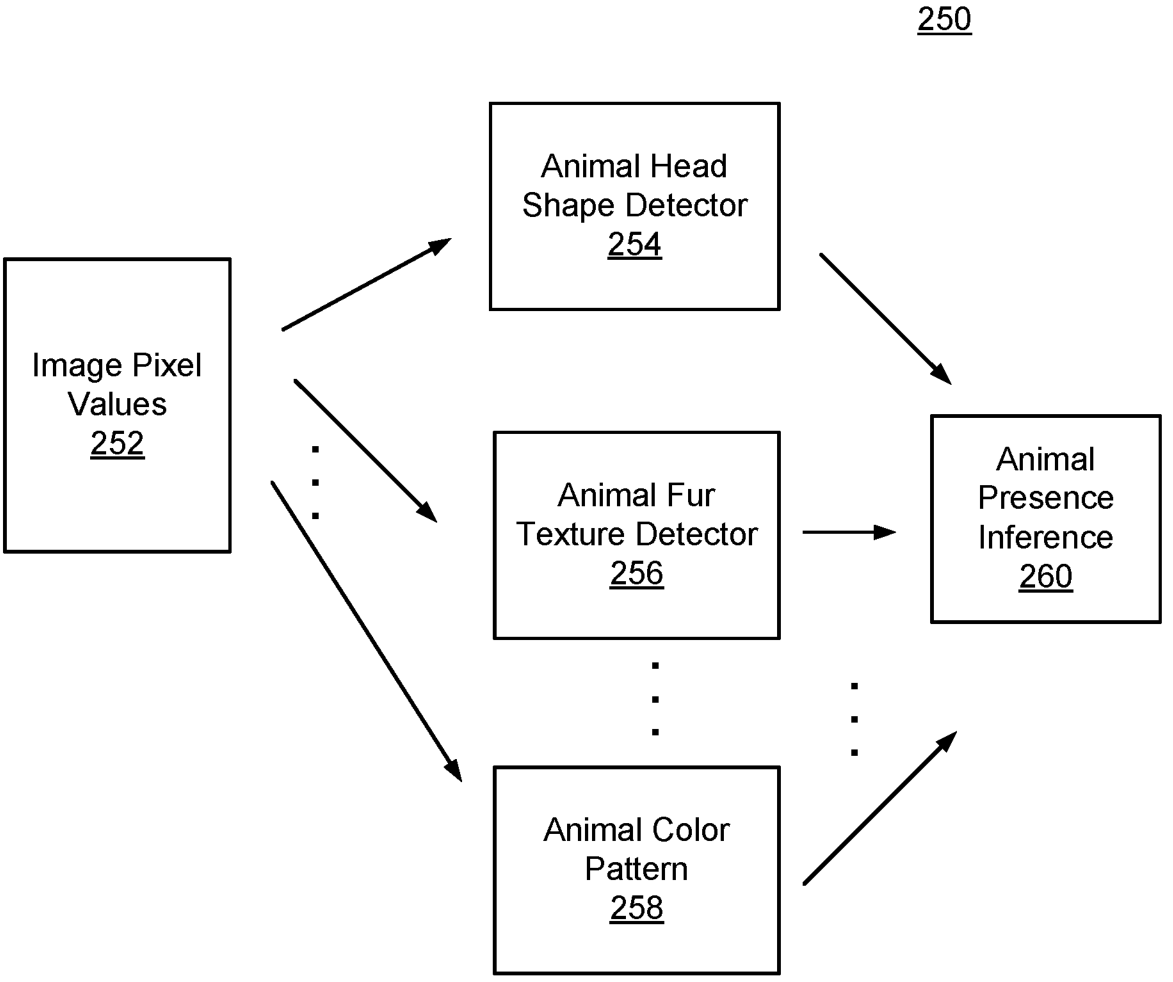

FIGS. 2A and 2B illustrated aspects of classification operations that may be performed by a computing device deployed in different deployment environments according to embodiments. For example, classification operations 200 may occur at a traffic intersection while classification operations 250 may occur at a zoo. According to an embodiment, image pixel values 202 and 252 may be obtained by sensors such as an imaging devices deployed in the different deployment environments. Classification operations 200 may be directed to classification of an object in image pixel values 202 as a car (e.g., at car presence inference 210). Here, one or more neural networks may be configured as feature detectors such as detectors 204, 206 and 208 to detect specific image features. In an implementation, such detectors 204, 206 and 208 may comprise filter paths that incorporate off-line training parameters (e.g., off-line training parameters 104). Similarly, classification operations 250 may be directed to classification of an object in image pixel values 252 as an animal (e.g., at animal presence inference 260). Here, one or more neural networks may be configured as feature detectors such as detectors 254, 256 and 258 to detect specific image features. In an implementation, such detectors 254, 256 and 258 may comprise filter paths that incorporate off-line training parameters (e.g., off-line training parameters 104).

According to an embodiment, an intelligent computing device (e.g., intelligent computing device 102) may be configured at a factory (e.g., based on off-line training parameters 104) to perform both classification operations 200 and 250. While an ability to perform classification operations 200 may be useful in a deployment environment such as a traffic intersection, an ability to perform classification operations 250 in such a deployment environment may be of little to no value. Likewise, while an ability to perform classification operations 250 may be useful in a deployment environment such as a zoo, an ability to perform classification operations 200 in such a deployment environment may be of little to no value.

According to an embodiment, an intelligent computing device deployed in a particular deployment environment may be de-configured to perform particular factory-enabled classification operations if, for example, such factory-enabled classification operations are determined to impart little to no utility in the particular deployment environment. For example, an intelligent computing device that is factory-enabled to perform classification operations 200 and 250 that is deployed in a zoo may be de-configured from performing classification operations 200. Similarly, an intelligent computing device that is factory-enabled to perform classification operations 200 and 250 that is deployed at a traffic intersection may be de-configured from performing classification operations 250.

For simplicity of illustration, the particular example illustrated in FIGS. 2A and 2B are directed to classification operations that may be performed on image pixel values (e.g., obtained from an imaging device). It should be understood, however, that claimed subject matter is not limited to classification operations in a domain of features for visual objects, and that other implementations may be directed to classification operations in a domain of audible features or atmospheric features (e.g., ambient light, temperature, atmospheric pressure), as well and/or in combination with features for visual objects.

Figure 3:
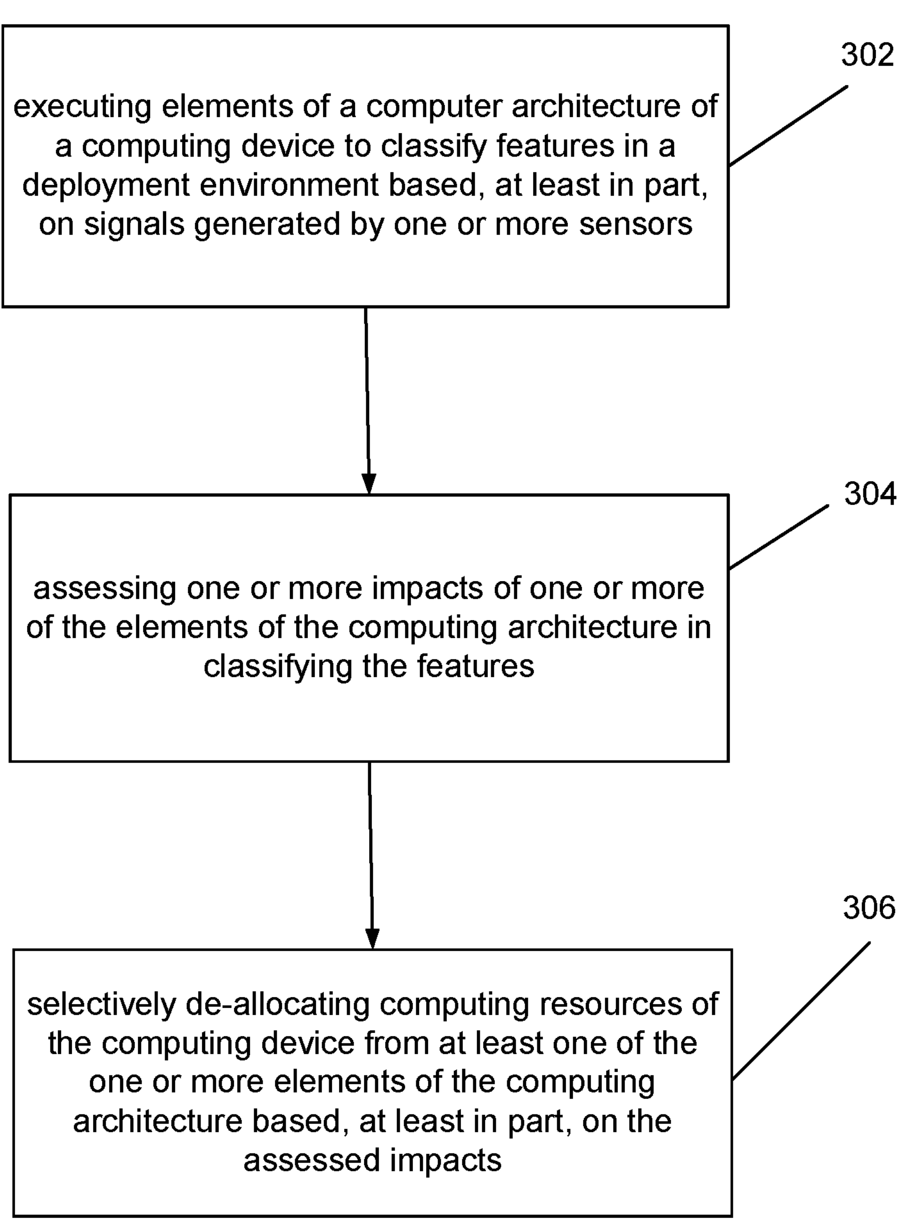
FIG. 3 is a flow diagram of a process to adapt a computing device to a deployment environment, according to an embodiment.

FIG. 3 is a flow diagram of a process 300 for configuring elements of a computing architecture of an intelligent computing device in a deployment environment according to an embodiment. According to an embodiment, an intelligent computing device (such as intelligent computing device 102) may comprise one or more sensors to generate signals responsive to phenomena in an immediate environment. For example, an intelligent computing device may comprise sensors to obtain observations of a physical environment. Such sensors may comprise, for example imaging devices, microphones, environmental sensors (e.g., light detectors, thermometers, radio frequency (RF) receivers, atmospheric pressure sensors), location/position sensors (e.g., accelerometers, gyroscopes, magnetometers), just to provide a few examples. Based, at least in part, on signals generated by such sensors, block 302 may execute elements of a computing architecture to classify physical features in a deployment environment.

In this context, a "computing architecture" as referred to herein means a combination and/or configuration of hardware and/or software elements to execute computing tasks according to a defined approach. Such a computing architecture may comprise, for example, one or more neural networks configured in software (e.g., as instructions stored in a non-transitory storage medium) and/or processors (e.g., central processing unit (CPU), digital signal processor (DSP), graphics processing unit (GPU), neural network processing unit (NPU)) to execute such software to perform classification operations, for example. It should be understood, however, that this is merely an example computing architecture, and that claimed subject matter is not limited in this respect. "Elements" of a computing architecture may comprise, for example, software and/or hardware features that define filters and/or filter paths formed by nodes, edges and/or associated weights of a neural network. In a particular implementation, such a computing architecture may be configured, at least in part, with parameters obtained from training operations. Such training parameters for a computing architecture of a computing device may be obtained in off-line training operations (e.g., off-line training parameters 104) that are performed in an environment other than in a particular environment in which the computing device is being deployed. Such off-line training operations for a CNN may comprise, for example, executing input parameter training sets and evaluating CNN states and/or output values with respect to testing parameters. Training parameters obtained in such off-line training operations may enable a CNN hosted in a computing device in a particular deployment environment to classify physical features in the particular deployment environment and other potential deployment environments other than the particular deployment environment. It should be understood, however, that these are merely examples of elements of a computing architecture, and that claimed subject matter is not limited in this respect.

Block 304 may comprise assessing one or more impacts of elements of a computing architecture in classifying the physical features during in connection with execution at block 302. In a particular implementation, block 304 may assess a response to one or more elements to an expected, known and/or predicted presence and/or absence of a physical feature. For example, state(s) of filters of a CNN may express an indication of certain patterns of an image. Filters configured as a vertical edge detector, for example, may provide high/maximal responses to portions of an image with vertical edges. Similarly, filters configured as a car detector may provide a high/maximal response to a presence of a certain orientation of a vehicle in such an image. In particular implementations, block 304 may assess magnitudes responses of certain filters of a CNN, and identify particular filters that do not significantly respond to an expected, known and/or predicted presence and/or absence of a physical feature.

According to an embodiment, a computing architecture may comprise a elements of a CNN including multiple layers. Such a layer in a CNN may be further partitioned into sub elements including, for example, individual filters making up the layer. Block 304 may identify individual filter of a layer of a CNN that provides little or no impact on a final classification result, for example.

In another example implementation, output signals of a CNN layer configured to detect a pattern may be received as input signals to one or more activation features formed by one or more rectified linear units (ReLUs) that map input signals below a threshold level to output signals having a value of zero. In an embodiment, repeated instances of an output of zero from an ReLU may indicate an absence of a pattern that a CNN layer is configured to detect. Depending, at least in part, on a particular pattern that a CNN layer is configured to detect, all or a portion of an associated filter channel may be determined to be insignificant for detection and/or classification of physical features in a deployment environment.

In the course of training parameters of a neural network, such parameters may be trained to reduce and/or minimize errors for an associated set of training parameters/observations for a robust set of classes/classifications of physical features. During deployment of a trained intelligent computing device (e.g., intelligent computing device 102), however, such a trained intelligent computing device may only observe a limited subset of physical features of the robust set depending on a particular deployment environment. According to an embodiment, block 304 may, based on sensor observations obtained during deployment, compute and/or evaluate a gradient to identify particular CNN layer enabled filters that are useful in the detection/classification of physical features observed during deployment. Such a gradient may be computed, for example, by computing a quantity—$\Sigma dL/da$ for observations collected by an end device to determine an impact on classification accuracy if an output feature map/activation is perturbed (where a may represent a value of an output feature map of a deep neural network layer and L may represent a classification loss). Such a computed gradient associated with an output feature map may provide an indication of a significance of the output feature map in a final determination of a feature class/classification. In other words, such a computing such a gradient may provide a metric for identifying a saliency of an associated output feature map. According to an embodiment, block 304 may determine that an output feature map associated with a low value for a computed gradient is insignificant and/or unimportant to classifying physical features in a deployment environment.

According to an embodiment, a neural network may be trained using dynamic computation to, among other things, compute saliency metrics for different elements of the neural network (e.g., a channel and/or patches of an output feature map). Such saliency metrics may be computed as saliency predictors in the course of executing discrimination-aware channel pruning (DCP) and/or soft channel pruning (SCP), for example. In an implementation, such computed saliency metrics may be stored (e.g., in a memory of intelligent computing device 102) in association with observations obtained during deployment. Neural network elements (e.g., channel and/or patches of an output feature map) associated with low saliency metrics may be determined to have low utility, significance and/or importance.

Based, at least in part, on impacts assessed and/or identified in block 304, block 306 may deallocate computing resources from one or more elements of a computing architecture of an intelligent computing device in a deployment environment. According to an embodiment, block 306 may comprise implementation of configuration parameters that may reduce usage of memory, processor/processing cycles and/or power. For filters identified in block 304 as having low utility, significance and/or importance to classification of physical features in a particular deployment environment, for example, block 306 may increase quantization of particular implementation features such as weights associated with nodes and/or edges, activation input values and/or output values. Alternatively, block 306 may entirely prune filters identified as having a low utility, significance and/or importance to classification.

According to an embodiment, block 304 may identify output patches for detection/analysis of an image feature to consistently map to a zero signal value (e.g., as determined by one or more associated ReLUs) over a duration. In implementation, block 306 may comprise adapting a neural network to ignore such output patches in analysis of subsequent images. This may reduce usage of computing resources in such analysis of subsequent images.

As pointed out above, saliency predictors may be computed in the course of executing DCP and/or SCP. In a particular implementation, block 306 may limit computation of saliency predictors to saliency predictors associated with specific filters and/or output patches having saliency predictors above a specific threshold level. As such, block 306 may prevent and/or inhibit saliency predictors that have low saliency to further reduce usage of computing resources.

According to an embodiment, portions of process may be performed at a remote and/or cloud-based server. In a particular implementation, a computing device deployed in a deployment environment may collect observations of physical features of the deployment environment and execute block 302 including execution of one or more CNNs to classify features in the deployment environment. Such a computing device may also collect state parameters such as magnitudes of output signals of filters formed in the one or more CNNs, and forward the collected state parameters in messages to a remote and/or cloud-based server. Based, at least in part, on such collected state parameters received in messages from the computing device deployed in the deployment environment, a remote and/or cloud-based server may construct an updated model (e.g., updated CNN model). Such an updated model may de-allocate resources from elements of a computing architecture (e.g., filters formed in CNN layers).

In another embodiment, multiple computing devices in a single deployment environment (e.g., multiple security cameras deployed in a single secured area) may forward messages comprising state parameters (such as magnitudes of output signals of filters formed in the one or more CNNs) to a remote and/or cloud-based server. The remote and/or cloud-based server may then construct an updated model to be provided to the multiple computing devices deployed in the single deployment environment.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 4:
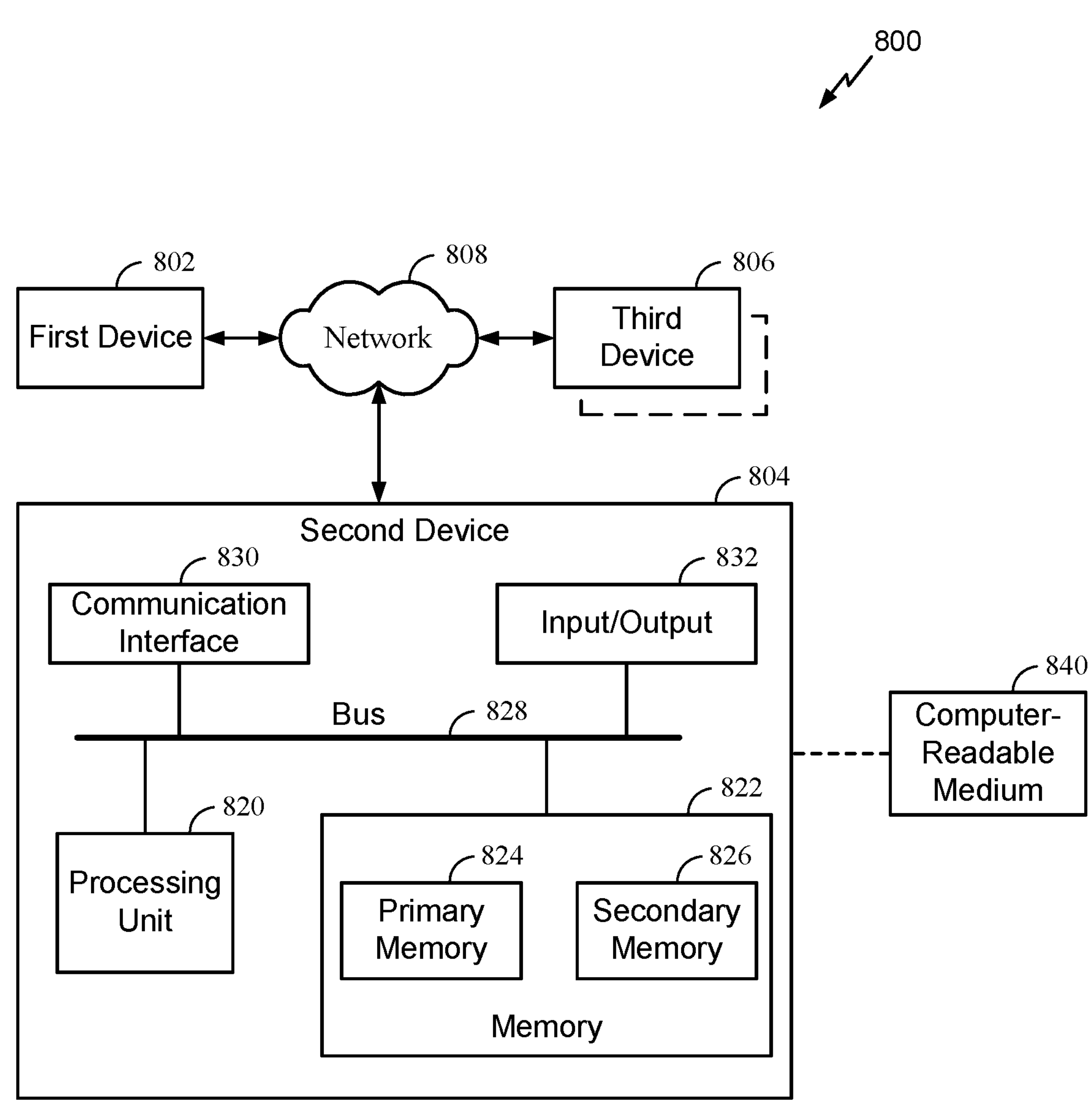
FIG. 4 is a schematic block diagram of an example computing system in accordance with an implementation.

In one example embodiment, as shown in FIG. 4, a system embodiment may comprise a local network (e.g., device 804 and medium 840) and/or another type of network, such as a computing and/or communications network. For purposes of illustration, therefore, FIG. 4 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 4 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 through FIG. 3 and in the text associated with the foregoing figure(s) of the present patent application.

Referring now to FIG. 4, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 4, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 4, is merely one example, and claimed subject matter is not limited in scope to this particular example. FIG. 4 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 4, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 4 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 4, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 4 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:

executing one or more elements of a computing architecture of a computing device to implement one or more filters to process signals generated by one or more sensors to affect a resulting state of at least one of the one or more filters, the computing architecture having been configured with parameters obtained in off-line training operation for detection and/or classification of physical features as physical objects in a plurality of deployment environments at a corresponding plurality of different locations to which the computing device is physically transportable, the physical objects to be present in respective deployment environments independently of and externally to the computing device, the resulting state of the at least one of the one or more filters to be indicative of a classification of physical features as objects expected to be present in a first deployment environment at a first location independently of and externally to the computing device, wherein the one or more filters are formed in a neural network and/or weights of the neural network determined by training operations and stored in a non-transitory storage medium prior to deployment of the computing device in the first deployment environment; and selectively de-configuring computing resources of the computing device for detection and/or classification of physical features as physical objects expected to be present in a second deployment environment at a second location distinct from the first location independently of and externally to the computing device responsive to the resulting state of the at least one of the one or more filters indicating an absence of at least one of the physical objects expected to be present in the second deployment environment at the second location independently of and externally to the computing device, wherein selectively de-configuring computing resources of the computing device from at least one of the one or more elements of the computing architecture comprises pruning at least a portion of nodes and/or edges in the neural network implementing one or more filters for detection and/or classification of at least some of the physical features as physical objects expected to be present in the second deployment environment at the second location.

2. The method of claim 1, wherein the physical features objects expected to be present in the second deployment environment comprise are detectable and/or classifiable based, at least in part, on detected image features or audio features, or a combination thereof.

3. The method of claim 1, and further comprising detecting the absence of the at least one of the physical objects expected to be present in the second deployment environment by identifying one or more computing paths having a low saliency in regard to classification of the at least one of the physical objects.

4. The method of claim 3, wherein selectively de-configuring computing resources of the computing device from at least one of the one or more elements of the computing architecture for detection and/or classification of physical features of physical objects expected to be present in a second deployment environment independently of and externally to the computing device further comprises:

affecting quantizing in filters in at least one of the identified one or more computing paths; or pruning at least one of the identified one or more computing paths, or a combination thereof.

5. The method of claim 3, wherein the computing paths are for detection of features not included in a reduced set of classification features for detection and/or classification of physical features as the at least one of the physical objects.

6. The method of claim 1, and further comprising detecting the absence of at least one of the physical objects expected to be present in the second deployment environment by identifying filters in the neural network having depressed and/or lower output magnitudes.

7. The method of claim 1, wherein the computing architecture comprises at least one convolutional neural network (CNN) layer, and one or more rectified linear units (ReLUs) to receive output signals from the CNN layer, and further comprising detecting the absence of at least one of the physical objects expected to be present in the second deployment environment by inferring an absence of at least one pattern detectable in the second deployment environment by the CNN layer responsive to detection of zero values set by the one or more ReLUs.

8. The method of claim 1, and further comprising inhibiting computation of output patches previously evaluated to be zero.

9. The method of claim 1, wherein selectively de-configuring further comprises:

inhibiting computation of at least some saliency predictors.

10. A computing device comprising:

one or more sensors; and one or more processors operatively coupled to the one or more sensors to:

execute one or more elements of a computing architecture of the computing device to implement one or more filters to process signals generated by the one or more sensors to affecting a resulting state of at least one of one or more filters, the computing architecture having been configured with parameters in off-line training operations for detection and/or classification of physical features as physical objects in a plurality of deployment environments at a corresponding plurality of different locations to which the computing device is physically transportable, the physical objects to be present in respective deployment environments independently of and externally to the computing device, the resulting state of the at least one of the one or more filters to be indicative of a classification of physical features as physical objects expected to be present in a first deployment environment at a first location independently of and externally to the computing device, wherein the one or more filters are formed in a neural network and/or weights of the neural network determined by training operations and stored in a non-transitory storage medium prior to deployment of the computing device in the first deployment environment; and selectively de-configure computing resources of the computing device for detection and/or classification of physical features as physical objects expected to be present in a second deployment environment at a second location distinct from the first location independently of and externally to the computing device responsive to the resulting state of the at least one of the one or more filters indicating an absence of at least one of the physical objects expected to be present in the second deployment environment at the second location independently of and externally to the computing device, wherein selective de-configuration of computing resources of the computing device from at least one of the one or more elements of the computing architecture comprises a prune of at least a portion of nodes and/or edges in the neural network implementing one or more filters for detection and/or classification of at least some of the physical features as physical objects expected to be present in the second deployment environment at the second location.

11. The computing device of claim 10, wherein the one or more processors are further to identify one or more computing paths having a low saliency in regard to classification of at least one physical feature to thereby detect the absence of the at least one of the physical objects expected to be present in the second deployment environment.

12. The computing device of claim 11, wherein, to selectively de-configure computing resources of the computing device from at least one of the one or more elements of the computing architecture, the one or more processors are further to:

affect quantizing in filters in at least one of the identified one or more computing paths; or prune at least one of the one or more identified computing paths, or a combination thereof.

13. The computing device of claim 11, wherein the computing paths are for detection of features not included in a reduced set of classification features.

14. The computing device of claim 10, wherein the one or more processors are further to identify filters in the neural network having depressed and/or lower output magnitudes to thereby detect the absence of the at least one of the physical objects expected to be present in the second deployment environment.

15. The computing device of claim 10, wherein the one or more processors are further to inhibit computation of at least some saliency predictors to thereby selectively de-configure computing resources from the at least one of the one or more elements of the computing architecture.

16. An article comprising:

a non-transitory storage medium having computer-readable instructions stored thereon which are executable by one or more processors of a computing device to:

execute one or more elements of a computing architecture of the computing device to implement one or more filters to process signals generated by one or more sensors to affect a resulting state of at least one of the one or more filters, the computing architecture having been configured with parameters obtained in off-line training operations for detection and/or classification of physical features as physical objects in a plurality of deployment environments at a corresponding plurality of different locations to which the computing device is physically transportable, the physical objects to be present in respective deployment environments independently of and externally to the computing device, the resulting state of the at least one of the one or more filters to be indicative of a classification of physical features as physical objects expected to be present in a first deployment environment at a first location independently of and externally to the computing device, wherein the one or more filters are formed in a neural network and/or weights of the neural network determined by training operations and stored in a non-transitory storage medium prior to deployment of the computing device in the first deployment environment; and selectively de-configure computing resources of the computing device for detection and/or classification of physical features as physical objects expected to be present in a second deployment environment at a second location distinct from the first location independently of and externally to the computing device responsive to the resulting state of the at least one of the one or more filters indicating an absence of at least one of the physical objects expected to be present in the second deployment environment at the second location independently of and externally to the computing device, wherein selective de-configuration of computing resources of the computing device from at least one of the one or more elements of the computing architecture comprises a prune of at least a portion of nodes and/or edges in the neural network implementing one or more filters for detection and/or classification of at least some of the physical features as physical objects expected to be present in the second deployment environment at the second location.

* * * * *